United States Patent
Zhou et al.

(10) Patent No.: US 8,300,376 B2
(45) Date of Patent: Oct. 30, 2012

(54) TEMPERATURE PROTECTION CIRCUIT

(75) Inventors: Hai-Qing Zhou, Shenzhen (CN); Yun-Shan Xiao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 354 days.

(21) Appl. No.: 12/835,741

(22) Filed: Jul. 14, 2010

(65) Prior Publication Data

US 2011/0310522 A1 Dec. 22, 2011

(30) Foreign Application Priority Data

Jun. 17, 2010 (CN) .......................... 2010 1 0202145

(51) Int. Cl.
*H02H 9/08* (2006.01)
(52) U.S. Cl. ....................... 361/103; 361/93.8
(58) Field of Classification Search ............. 361/18, 361/103, 106
See application file for complete search history.

(56) References Cited

U.S. PATENT DOCUMENTS 5,291,387 A * 3/1994 Ohshima .................... 363/56.11
6,005,761 A * 12/1999 Izawa et al. .................. 361/103
* cited by examiner

*Primary Examiner* — Danny Nguyen
(74) *Attorney, Agent, or Firm* — Altis Law Group, Inc.

(57) ABSTRACT

A temperature protection circuit includes a detection circuit, a comparison circuit, a switching circuit, and a control circuit. When the temperature of an electronic device is below a preset temperature, a detecting voltage signal exceeds a reference temperature signal, and the comparison circuit outputs a control signal to open the switching circuit. The control circuit directs a power circuit to provide voltage to an operating circuit. When a temperature of the electronic device exceeds the preset temperature, the detecting voltage signal is below the reference temperature signal, and the comparison circuit outputs a control signal to close the switching circuit. The control circuit directs the power circuit to stop supplying voltages to the operating circuit.

8 Claims, 2 Drawing Sheets

TEMPERATURE PROTECTION CIRCUIT

BACKGROUND

1. Technical Field

The present disclosure relates to protection circuits.

2. Description of Related Art

When a temperature of an electronic device exceeds a rated maximum, the device may be damaged or perform erratically. Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the drawings is illustrated by way of example and not by limitation. It should be noted that references to "an" or "one" embodiment in this disclosure are not necessarily to the same embodiment, and such references mean at least one.

Figure 1:
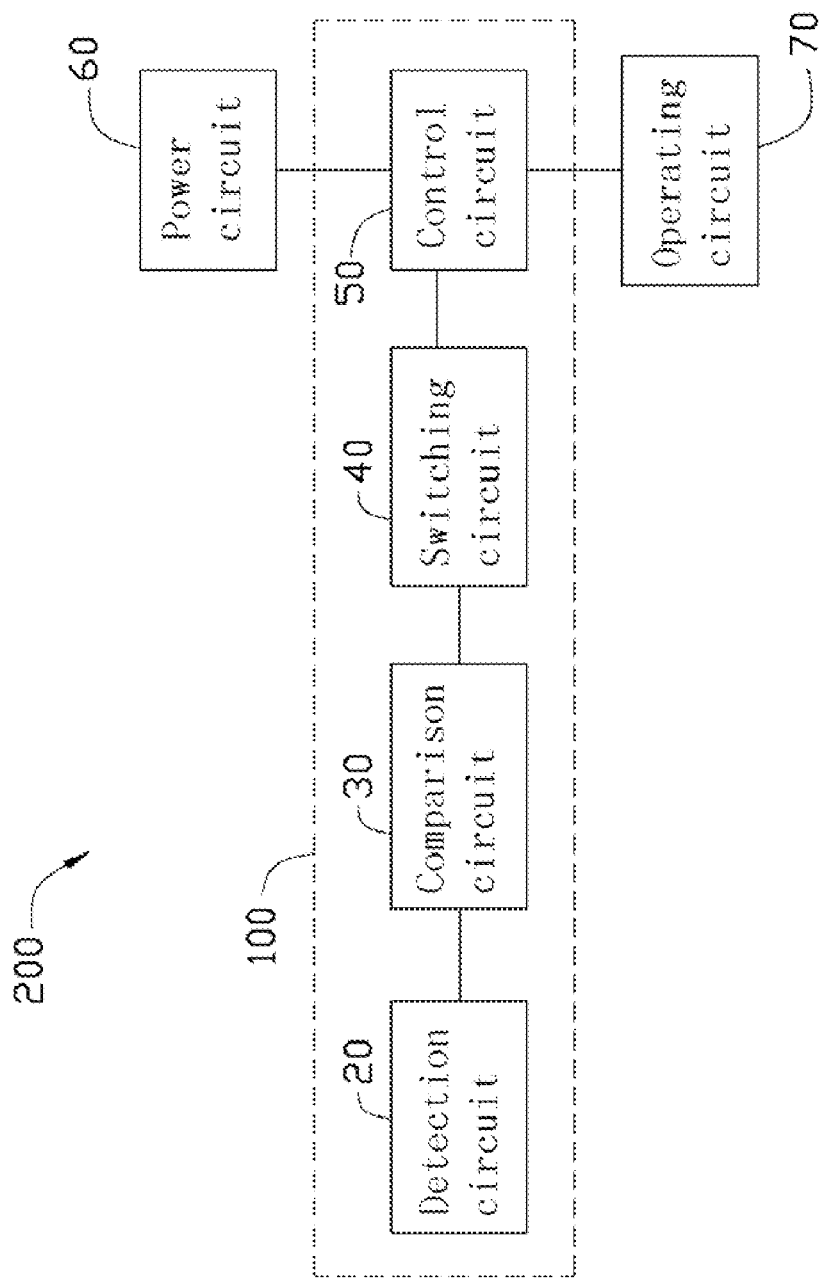
FIG. 1 is a block diagram of an exemplary embodiment of a temperature protection circuit connected between a power circuit and an operating circuit.

Referring to FIG. 1, an exemplary embodiment of a temperature protection circuit 100 is housed in an electronic device 200. The temperature protection circuit 100 is connected between a power circuit 60 and an operating circuit 70 of the electronic device 200, and prevents output voltage of the power circuit 60 from reaching the operating circuit 70 when the temperature of the electronic device 200 exceeds a rated maximum. The temperature protection circuit 100 includes a detection circuit 20, a comparison circuit 30, a switching circuit 40, and a control circuit 50.

The detection circuit 20 determines a temperature of the electronic device 200 and outputs a detected temperature signal to the comparison circuit 30. The comparison circuit 30 receives the detected temperature signal and compares the received detected temperature signal with a reference temperature signal, and outputs a control signal to the switching circuit 40, to open or close the switching circuit 40. When the switching circuit 40 is open, the control circuit 50 receives a high level signal and directs the power circuit 60 to provide a voltage to the operating circuit 70. When the switching circuit 40 is closed, the control circuit 50 receives a low level signal and directs the power circuit 60 to stop supplying voltage to the operating circuit 70.

Figure 2:
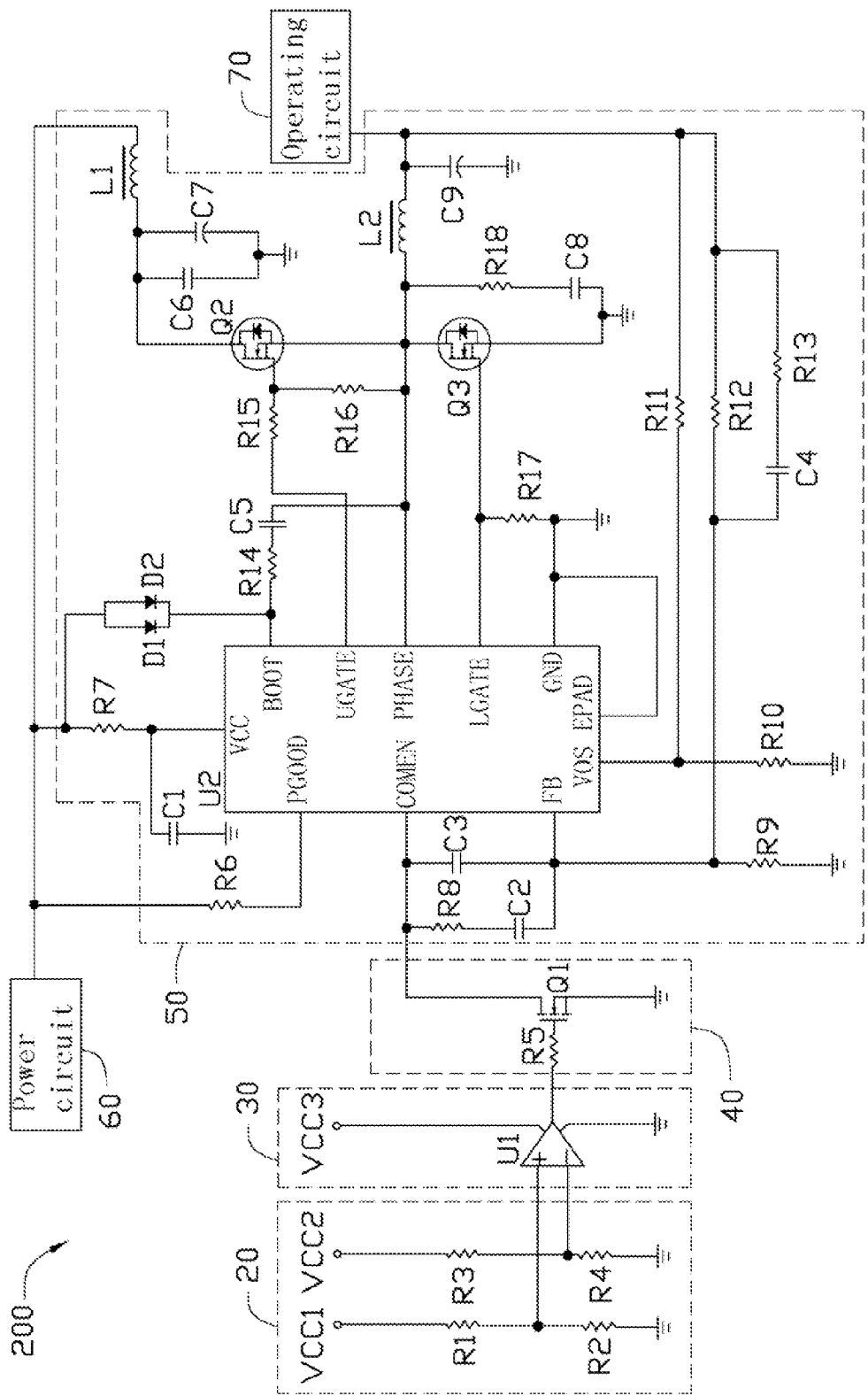
FIG. 2 is a circuit diagram of the temperature protection circuit of FIG. 1.

Referring to FIG. 2, the detection circuit 20 includes first power source VCC1 and second power source VCC2 and resistors R1-R4. The first power source VCC1 is grounded via the resistors R1 and R2. The second power source VCC2 is grounded via the resistors R3 and R4. The comparison circuit 30 is connected to a node between the resistors R1 and R2, and also to a node between the resistors R3 and R4. In one embodiment, the resistor R4 is a negative temperature coefficient thermal resistor. A node voltage between the resistors R1 and R2 is a reference voltage, corresponding to a preset temperature value for the electronic device 200. The reference voltage can be regulated by varying/changing resistances of the resistors R1 and R2.

The comparison circuit 30 includes a comparator U1 and a third power source VCC3. A non-inverting input terminal of the comparator U1 is connected to a node between the resistors R1 and R2. An inverting input terminal of the comparator U1 is connected to a node between the resistors R3 and R4. A voltage terminal of the comparator U1 is connected to the third power source VCC3. A ground terminal of the comparator U1 is grounded. An output terminal of the comparator U1 is connected to the switching circuit 40.

The switching circuit 40 includes an electronic switch, such as a field effect transistor (FET) Q1 and a resistor R5. A gate of the FET Q1 is connected to the output terminal of the comparator U1 via the resistor R5. A source of the FET Q1 is grounded. A drain of the FET Q1 is connected to the control circuit 50. In one embodiment, the FET Q1 is an n-channel FET.

The control circuit 50 includes a pulse generator U2, capacitors C1-C9, resistors R6-R8, diodes D1 and D2, inductors L1 and L2, and electronic switches, such as FETs Q2 and Q3. An input pin COMEN of the pulse generator U2 is connected to the drain of the FET Q1 and also to a feedback pin FB of the pulse generator U2 via the resistor R8 and the capacitor C2. A voltage pin PGOOD of the pulse generator U2 is connected to the power circuit 60 via the resistor R6. The voltage pin VCC is grounded via the capacitor C1 and also to the power circuit 60 via the resistor R7. The power circuit 60 is connected to anodes of the diodes D1 and D2. Cathodes of the diodes D1 and D2 are connected to an input/output (I/O) pin BOOT of the pulse generator U2. The I/O pin BOOT of the pulse generator U2 is connected to an I/O pin PHASE of the pulse generator U2 via the resistor R14 and the capacitor C5. An I/O pin UGATE of the pulse generator U2 is connected to a gate of the FET Q2 via the resistor R15. A drain of the FET Q2 is connected to the power circuit 60 via the inductor L1. The capacitor C6 is connected between the drain of the FET Q2 and ground. The capacitor C7 is parallel to the capacitor C6. A source of the FET Q2 is connected to a drain of the FET Q3. A gate of the FET Q3 is connected to an I/O pin LGATE of the pulse generator U2. A source of the FET Q3 is grounded. The drain of the FET Q3 is connected to a first end of the inductor L2. A second end of the inductor L2 is connected to the operating circuit 70. The capacitor C9 is connected between the second end of the inductor L2 and ground. The resistor R18 and the capacitor C8 are connected between the drain of the FET Q3 and ground. The I/O pin PHASE of the pulse generator U2 is connected to a node between the source of the FET Q2 and the drain of the FET Q3. The resistor R16 is connected between the I/O pin PHASE of the pulse generator U2 and the gate of the FET Q2. The resistor R17 is connected between the gate of the FET Q3 and ground. Ground pins GND and EPAD of the pulse generator U2 are grounded. An I/O pin VOS of the pulse generator U2 is grounded via the resistor R10. The second end of the inductor L2 is connected to the I/O pin VOS of the pulse generator U2 via the resistor R11. The input pin COMEN of the pulse generator U2 is grounded via the capacitor C3 and the resistor R9. The second terminal of the inductor L2 is connected to a node between the capacitor C3 and the resistor R9 via the resistor R12. The resistor R13 is connected to the capacitor C4 in series, and then connected to the resistor R12 in parallel. In one embodiment, the FETs Q2 and Q3 are n-channel FETs.

In use, when the temperature of the electronic device 200 is below the preset temperature value, the resistance of the resistor R4 exceeds the normal resistance of the resistor R4. A voltage of the inverting input terminal of the comparator U1 exceeds the reference voltage of the non-inverting input terminal of the comparator U1. The output terminal of the comparator U1 outputs a low level signal to the FET Q1. The FET Q1 is turned off. The input pin COMEN of the pulse generator U2 receives a high level signal to initialize the pulse generator U2 to operate normally. The pulse generator U2 alternately outputs a high level signal and a low level signal. When the I/O pin UGATE of the pulse generator U2 outputs a high level signal and the I/O pin LGATE of the pulse generator U2 outputs a low level signal, the FET Q2 is turned on and the FET Q3 is turned off. The power circuit 60 provides a voltage to the operating circuit 70 via the FET Q2. At the same time, the inductor L2 stores charges. When the I/O pin UGATE of the pulse generator U2 outputs a low level signal and the I/O pin LGATE of the pulse generator U2 outputs a high level signal, the FET Q2 is turned off and the FET Q3 is turned on. The inductor L2 powers the operating circuit 70. Thus, the electronic device 200 operates normally.

When the temperature of the electronic device 200 exceeds the preset temperature value, the resistance of the resistor R4 is below the normal resistance of the resistor R4. A voltage of the inverting input terminal of the comparator U1 is below the reference voltage of the non-inverting input terminal of the comparator U1. The output terminal of the comparator U1 outputs a high level signal to the FET Q1. The FET Q1 is turned on. The input pin COMEN of the pulse generator U2 receives a low level signal from the drain of the FET Q1, and the pulse generator U2 stops. The FET Q2 and Q3 receive low level signals and are turned off. The power circuit 60 does provide no voltage to the operating circuit 70.

Accordingly, the temperature protection circuit 100 protects the electronic device 200 from damage when the temperature thereof exceeds a preset temperature value.

The temperature protection circuit 100 detects the temperature of the electronic device 200 and outputs a control signal to prevent the output voltage of the power circuit 60 from reaching the operating circuit 70 of the electronic device 200 when the temperature of the electronic device 200 exceeds the preset temperature value.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A temperature protection circuit connected between a power circuit and an operating circuit, the temperature protection circuit comprising:
a detection circuit to determine a temperature of an electronic device, and output a detected temperature signal and a reference temperature signal corresponding to a preset temperature value for the electronic device;
a comparison circuit connected to the detection circuit, to receive the detected temperature signal and the reference temperature signal from the detection circuit and compare the detected temperature signal to the reference temperature signal, and output a control signal;
a switching circuit connected to the comparison circuit, wherein the comparison circuit outputs the control signal to open or close the switching circuit;
a control circuit connected to the switching circuit, the power circuit, and the operating circuit, wherein when a temperature of the electronic device is below the preset temperature value for the electronic device, the detected temperature signal exceeds the reference temperature signal received by the comparison circuit, the comparison circuit outputs a control signal to open the switching circuit, the control circuit directs the power circuit to provide a voltage to the operating circuit of the electronic device, and when a temperature of the electronic device exceeds the preset temperature, the detected temperature signal is below the reference temperature signal of the electronic device, the comparison circuit outputs a control signal to close the switching circuit, and the control circuit directs the power circuit to stop supplying voltages to the operating circuit of the electronic device.

2. The temperature protection circuit of claim 1, wherein the detection circuit comprises first and second power sources, first to third resistors, and a thermal resistor, the first power source grounded via the first and the second resistors, the second power source grounded via the third and the thermal resistor, the comparison circuit connected to a node between the first and the second resistors, and also to a node between the third and the thermal resistor, the reference voltage is a node voltage between the first and the second resistors, wherein the measurement voltage is a node voltage between the third resistor and the thermal resistor.

3. The temperature protection circuit of claim 2, wherein the thermal resistor is a negative temperature coefficient thermal resistor.

4. The temperature protection circuit of claim 2, wherein the comparison circuit comprises a comparator, a non-inverting input terminal of which is connected to the node between the first and the second resistors, an inverting input terminal of which is connected to the node between the third resistor and the thermal resistor, a voltage terminal of which is connected to a third power source, a ground terminal of which is grounded, and an output terminal of which is connected to the switching circuit, outputting a control signal thereto.

5. The temperature protection circuit of claim 4, wherein the switching circuit comprises a first electronic switch and a fourth resistor, wherein a first terminal of the first electronic switch is connected to the output terminal of the comparator via the fourth resistor, a second terminal of the first electronic switch is connected to the control circuit, and a third terminal of the electronic switch is grounded.

6. The temperature protection circuit of claim 5, wherein the first electronic switch is an n-channel field effect transistor (FET), and the first to third terminals of the first electronic switch are a gate, a drain, and a source of the FET, respectively.

7. The temperature protection circuit of claim 6, wherein the control circuit comprises a pulse generator, fifth to seventh resistors, first and second inductor, and second and third electronic switches, an input pin of the pulse generator is connected to the second terminal of the first electronic switch, a first voltage pin of the pulse generator is connected to the power circuit via the fifth resistor, a second voltage pin of the pulse generator is connected to the power circuit via the sixth resistor, a first output pin of the pulse generator is connected to a first terminal of the second electronic switch via the seventh resistor, a second terminal of the second electronic switch is connected to the power circuit via the first inductor, a third terminal of the second electronic switch is connected to a second terminal of the third electronic switch, a first terminal of the third electronic switch is connected to a second output pin of the pulse generator, a third terminal of the third electronic switch is grounded, the second terminal of the third electronic switch is connected to the operating circuit via the second inductor, a third output pin of the pulse generator is connected to a node between the third terminal of the first electronic switch and the second terminal of the second electronic switch, grounded pins of the pulse generator are grounded.

8. The temperature protection circuit of claim 7, wherein the second and the third electronic switches are n-channel field effect transistors (FETs), and the first to third terminals of the second and the third electronic switches are gates, drains, and sources of the FETs, respectively.

* * * * *